United States Patent [19]
Green et al.

[11] Patent Number: 5,520,585
[45] Date of Patent: May 28, 1996

[54] PLASTIC CHAIN, MODULE AND SPROCKET CLUSTER

[76] Inventors: Arthur G. Green, 15654 Ridge Estates Rd.; David B. Palley, 11352 Marjon Dr., both of Nevada City, Calif. 95959

[21] Appl. No.: 281,775

[22] Filed: Jul. 27, 1994

[51] Int. Cl.⁶ .................................................... F16G 13/02
[52] U.S. Cl. ............................................. 474/206; 474/207
[58] Field of Search .................................. 474/206, 207, 474/212–217

[56] References Cited

U.S. PATENT DOCUMENTS

| | | | |
|---|---|---|---|
| 3,628,834 | 12/1971 | Anderson | 474/207 X |
| 5,125,874 | 6/1992 | Fryer et al. | 474/207 X |
| 5,320,584 | 6/1994 | Hynes | 474/207 |

*Primary Examiner*—Michael Powell Buiz

[57] ABSTRACT

The chain is constructed of plastic modules connected in end to end relationship. It is claimed for all chain uses, including but not limited to use as a drive chain. Each individual module is without moving parts and, in most drive chain applications, has a cavity between its front and rear ends for receiving a tooth of a sprocket wheel. Each pair of adjacent modules has a transverse pin or pins extending from one module into a transverse pin-receiving socket or sockets of the other module so as to form a rotatable joint between the modules. Various means of constructing and joining the modules are disclosed. The plastic bicycle sprocket ring cluster which the plastic chain permits consists of stair-stepped multiple concentric rings of teeth which can be wider than a conventional bicycle chain now allows and which together can support each other by means of a common plastic infrastructure. The chain and cluster are light-weight and non-rusting; they can be also self-lubricating and colorful.

35 Claims, 9 Drawing Sheets

PLASTIC CHAIN, MODULE AND SPROCKET CLUSTER

BACKGROUND OF THE INVENTION

1. Field of the Invention

The present invention relates generally to chains, including but not limited to those used to transmit torque between sprocket wheels, and more particularly to an adjustable segmented chain, having a plurality of substantially similar modular links, or pairs of links, capable of interconnecting to form a closed loop chain, such as is commonly used to transmit pedal or motor generated power to one or more drive axles, wheels, or accessories in bicycles, motorcycles, pedal boats, automobiles, household appliances (such as washing machines and driers), and in industrial, military, space, and extreme environment applications. The chain of the present invention may also have applications as a tow chain, as an anchor chain, as a chain used for jewelry bracelets and necklaces, for strap handles of suitcases or purses, as clothing belts, etc.

2. Description of Related Art

Chains are commonly used to transmit torque between rotating devices: for example, bicycle chains transmit torque between sprocket wheels. Conventional bicycle chains, as have been used for one hundred years, consist of a closed oval or circular loop made of a plurality of multi-pan metal modules or links, narrow links alternating and hinged together with wide ones, each link being fitted at its interior to receive the teeth of sprocket wheels, and each link interleaving end-to-end with its adjoining neighbor, joined together by a shared metal pin set perpendicular to the length of the joined links and which pin acts as a fulcrum or axle allowing pivoting between each of the chain's pairs of links to occur substantially in one single plane around that axle. The chains for bicycles which use a derailleur shifting arrangement must allow adjoining links to pivot two directions to accommodate primary and reverse curves (around the derailleur) in one plane; also, for the chain to be derailed from one sprocket wheel to another in the same concentric cluster, a certain small amount of lateral slip or pivot is allowed to occur at the pivoting connection between chain links.

Chains must provide tensile strength to withstand and transmit torque. The perpendicular structure of each link which meshes with the teeth of sprocket wheels must provide both impact and tensile strength. In addition, chain links must pivot with respect to one another to permit the chain to conform and bend either direction in one plane around sprocket wheels without excessive friction and wear. To provide the required strength, conventional chains are made of metal. To permit pivoting, the links of conventional chains are hinged with and connected by metal pins which function as axles, relative to which are attached and turn the two separated side pieces of one module before and those of another behind.

Like the spacing of their sidewalls, conventional chain links are alternatively wide and narrow. The pin is riveted or splayed at each end to sandwich, and prevent the escape of various skewered metal parts: e.g. a more widely spaced side piece from the left module but which extends some distance above, below and beyond the pin connection; then, rubbing against it, a side piece from the right module and its extension; then a wide washer; then the other side piece from the right module, including its extensions; then the other side piece from the (more wide-sided) left module, including extensions; then the rivet or splayed other end of the pin. The spacing "washer" at the middle of each such pin sandwich holds the left and right sidewalls of each module separate from each other to permit entry of sprocket teeth but allows friction to occur between the two left sides of adjoining modules and the two corresponding fight sides. There is friction also between the washer ends and the module sidewalls which touch it, and between the pin and all the components it penetrates. By its bulk this washer also protects the modules' interconnecting metal hinge pins from the wear they would experience if they were struck repeatedly and directly by the teeth as sprocket wheel and chain engaged or if the pedal or motor power applied between sprocket tooth and chain were carried directly by and to the narrow pin in contact with the working edges of sprocket wheel teeth across the direction of their work. Lubricants such as oil typically are used to reduce friction at the points where module side walls and washers turn against one another, the teeth, and pins.

Conventional chain designs, as described above and in common use to transmit power to bicycle drive wheels, have changed little for decades. U.S. Pat. No. 1,130,582 J. M. Dodge, Mar. 2, 1915, is not fundamentally different from the more recent patents reviewed, which reflect mere modifications and improvements. For example, U.S. Pat. No. 4,596,539 K. Yamasaki, May 7, 1985, to facilitate the chain being derailed from one sprocket wheel to another, introduces cutouts or hollows on the inward-facing marginal edges of the wider links. U.S. Pat. No. 4,960,403 M. Nagano, Jul. 28, 1989, proposes deforming the metal of the wider links outward to accomplish the same purpose. U.S. Pat. No. 5,226,857 T. Ono, May 13, 1992, blends the improvements of the Yamasaki and Nagano patents and asserts that the metal deformation and hollowing need occur on one side of the chain only, since the shifting problem noted is significant primarily when the chain goes from a smaller to a larger sprocket wheel (and not vice versa) and since a bicycle's rear sprocket cluster typically has more narrowly spaced and more stages than does its front sprocket cluster.

U.S. Pat. No. 5,288,278 M. Nagano, Dec. 30, 1991, modifies the standard bicycle chain link by adding a flexion limiting device intended to prevent chain tangling during bumpy mountain bike rides. This patent too is limited to conventional chains which employ alternating narrower and wider links rotatably coupled by pins.

All of the conventional chains reviewed tend to be made of steel or other metal. They tend not to slip against the wheels they turn, as belts may against smooth pulleys, because they make a strong mechanical connection, link against sprocket, perpendicular to the direction of chain movement. However, chains so designed have several drawbacks, the relative importance of which in the bicycle application are roughly as follows: (1) they are relative heavy; (2) they rust; (3) they consist of multiple pans; (4) they are complex to manufacture, (5) they present much surface area to dirt and contamination; (6) they require repeated applications of messy, dirt-collecting oil for lubrication; (7) they are hindered by friction between links during rotation; (8) they wear out and/or stretch; (9) they are noisy; and (10) they can be difficult to install and replace.

As a result of the foregoing drawbacks, conventional chains tend to be used only in applications where power transmission is paramount, giving way to belts in other applications. In addition, conventional chains leave something to be desired, at least for certain applications, in other respects. (11) Their high mass and inertia make them somewhat difficult to accelerate and decelerate. (12) They are not particularly aerodynamic. (13) They are wider than is strictly functional, due to their alternatingly wide and narrow sidewalls. (14) They require a specially designed link pin where breakage, if any, tends to occur. (15) Like a baseball bat they are inflexible, and thus they cannot store and release power like a golf club. (16) Their length is not easily varied.

The present invention is a different kind of chain, as strong and powerful as needed, yet designed to minimize each of the disfunctionalities associated with conventional type chains. (1) The modules and chain of the present invention are light weight, being formed typically of injection molded plastics the specific gravities of which may be a fraction (often less than one-sixth) that of their conventional metal counterparts. Sprocket clusters too can be made of lightweight plastic once chains are. This further increases the weight savings. The dimensions of the modules also can be reduced to further reduce weight, if appropriate in terms of the balance of other characteristics desired. In the cycling world, light weight is particularly important for racing and hill climbing applications.

(2) Because it is made of plastic the present invention does not rust. Rust is a major problem for the chains of many amateur cyclists.

(3) The present design involves many fewer parts than the conventional one. Each standard module is of one piece only (typically consisting of two injection-molded pieces bonded or otherwise joined to one another during assembly). Some, but not all, embodiments also require a second type of module for closing and unclosing the loop, which again may be formed of only two pieces removably connected. (4) Fewer parts should mean simpler manufacturing and assembly processes. (5) Unibody modules present a minimal surface area to dirt and contamination.

(6) A number of the plastics which could be used, such as nylon with fiberglass, are or can be considered to be, self-lubricating; thus, the use of oil lubricants can be reduced or eliminated, in turn reducing mess and the adhesion of dirt. Anti-static properties can be given the plastic also to minimize dust and dirt collection, and the rotating joint between modules can itself be shaped so that it will tend to expel contaminants. (7) The present design reduces friction, not only by reducing dirt and contaminants. With the present design, unlike the conventional one, there is little or no friction between the sidewalls of different links when they rotate with respect to one another, nor between sidewalls and the "washer" or other bulk surrounding the pin. Thus a reduced surface area bears friction when the links pivot.

(8) Reducing dirt and friction reduces chain wear. The wear and/or stretch associated with the present invention also will depend on the characteristics of the plastics and additives (e.g. carbon fiber or glass) used, with tradeoffs perhaps necessary at this stage in plastics engineering between strength (impact and/or tensile), on the one hand, and optimal weight and lubricity characteristics, on the other. (9) Plastic links are relatively quiet. (10) The chain of the present invention is relatively simple to install and replace. In a preferred embodiment, it requires the use of no tools to assemble and no tools, or a cutting tool only, to disassemble. It is feasible to replace individual links, not just the entire chain. And it is unnecessary to remove the bicycle's wheels to remove or install the chain.

(11) The chain of the present invention has low mass and inertia. Thus a bicycle using it will be relatively easy to pedal. (12) The links of this chain have smooth, rounded edges and are identical to one another in shape and size, not angular and alternatingly wide and narrow like the conventional chain; hence the chain is aerodynamic, and (13) its overall width may be reduced, if desired, thus permitting more tightly clustered, hence more, sprockets. (14) This chain requires no specially designed, breakage-prone link pin, thus it can be engineered without points more liable to break than the others. (15) The present invention can be made of flexible materials, if desired. In conjunction with oval sprocket wheels or the like, such chain flexibility could be useful to store and release pedal power so as to smooth or otherwise optimize the power curve. (16) The present invention permits ready changes in chain length and tension since the number of links to be used is variable and can be modified from time to time with relative ease.

OBJECTS

An object of this invention is to provide an improved bicycle chain which will work on existing conventional bicycles in replacement of a conventional bicycle chain.

Another object of this invention is to provide an improved racing bicycle chain which will work on existing racing bicycles in replacement of existing racing bicycle chains.

Another object of this invention is to provide an improved mountain bicycle chain which will work on existing mountain bicycles in replacement of existing mountain bicycle chains.

Another object of this invention is to provide a light weight bicycle chain, optimally lighter than existing alternatives.

Another object of this invention is to provide a bicycle chain not susceptible to rust.

Another object of this invention is to provide a bicycle chain with relatively few parts.

Another object of this invention is to provide a bicycle chain which is simple to manufacture.

Another object of this invention is to provide a bicycle chain which stays relatively free of dirt and dust contamination.

Another object of this invention is to provide a bicycle chain which requires little or no oil lubrication and thus tends to remain, and to keep its rider and those who service it, clean of messy oil and dirt associated with oil.

Another object of this invention is to provide a bicycle chain the links of which pivot with respect to one another with relatively little friction.

Another object of this invention is to provide a bicycle chain the longevity of which compares favorably to existing alternatives.

Another object of this invention is to provide a bicycle chain which can be built narrower than existing alternatives.

Another object of this invention is to provide a bicycle capable of achieving more, and more subtle, gear changes, as permitted because a narrower chain means that the bicycle's concentric sprocket wheels can be spaced more closely together than is possible given today's relatively unnarrowable multi-part metal bicycle chains.

Another object of this invention is to provide a bicycle chain which is relatively quiet in operation.

Another object of this invention is to provide a bicycle chain which is relatively easy to install and replace.

Another object of this invention is to provide a bicycle chain which has low mass and inertia and is thus relatively easy to pedal and disinclined to tangle regardless of bumpy terrain.

Another object of this invention is to provide a bicycle chain which has improved aerodynamic characteristics.

Another object of this invention is to provide a bicycle chain which requires no specially designed, breakage-prone link pin.

Another object of this invention is to provide a bicycle chain, the links of which can themselves be flexible to store and release pedal power should this be desired to optimize the pedal power curve in certain applications, for example, in conjunction with oval sprocket wheels.

Another object of this invention is to provide a bicycle chain, the length and tension of which may be modified from time to time with relative ease.

An object of this invention is to provide an improved motorcycle chain which will work on existing conventional motorcycles in replacement of a conventional motorcycle chain.

Another object of this invention is to provide a light weight motorcycle chain, optimally lighter than existing alternatives.

Another object of this invention is to provide a motorcycle chain not susceptible to rust.

Another object of this invention is to provide a motorcycle chain with relatively few parts.

Another object of this invention is to provide a motorcycle chain which is simple to manufacture.

Another object of this invention is to provide a motorcycle chain which stays relatively free of dirt and dust contamination.

Another object of this invention is to provide a motorcycle chain which requires little or no oil lubrication and thus tends to remain, and to keep its rider and those who service it, clean of messy oil and dirt associated with oil.

Another object of this invention is to provide a motorcycle chain the links of which pivot with respect to one another with relatively little friction.

Another object of this invention is to provide a motorcycle chain and sprocket system the longevity of which compares favorably to existing alternatives.

Another object of this invention is to provide a motorcycle chain which is relatively quiet in operation.

Another object of this invention is to provide a motorcycle chain which is relatively easy to install and replace.

Another object of this invention is to provide a motorcycle chain which has low mass and inertia.

Another object of this invention is to provide a motorcycle chain which has improved aerodynamic characteristics.

Another object of this invention is to provide a motorcycle chain which requires no specially designed, breakage-prone link pin.

Another object of this invention is to provide a motorcycle chain, the links of which can themselves be flexible should this be desired to optimize the pedal power curve in certain applications, for example, in conjunction with oval sprocket wheels.

Another object of this invention is to provide a motorcycle chain, the length and tension of which may be modified from time to time with relative ease.

Another object is to provide an improved endless type chain with superior durability and useful life due to superior design, the advantages of which include: strength, uniformity, and range of choices of component material; the maximal and equal sizing of all stress-bearing pans of each module so as to avoid weak points; and the confinement movement between surfaces to chain pivot points designed for minimum friction, thereby minimizing deformity, wear and need for lubricants.

Another object is to provide an endless type chain of linked rigid segments of such material and so joined that the joints are, or can be, self-lubricating without need of din-collecting oil.

Another object is to provide an endless type chain of linked rigid segments which may be antistatically treated so that it and they tend to remain dirt-free and relatively free of din-induced friction.

Another object is to provide an endless chain of linked rigid segments which are so joined that the areas where friction occurs at the pivot points between links is relatively enclosed and isolated from contaminating and friction-causing dust and din.

Another object is to provide an endless chain of linked rigid segments which are so joined that centrifugal and other mechanical forces would tend to expel friction-causing dust and dirt from the pivot points between links.

Another object is to provide an endless chain of linked rigid segments which can be simply and inexpensively manufactured, because each of its modules consists of one piece only, such modules also being typically all identical, or of two types only, and capable of being snapped, locked, glued, ultrasonically bonded, or otherwise bonded together.

Another object is to provide an endless chain of linked rigid segments which do not rust.

Another object is to provide an endless chain of linked rigid segments of relatively light-weight material.

Another object is to provide a bicycle or motorcycle chain in color or colors, including varied and vivid colors and rearrangeable patterns of color to appeal to different classes of consumers, to allow differentiation in marketing, and to allow consumers to artistically personalize their own chains.

Another object is to provide a bicycle or motorcycle or other chain in a variety of materials, including materials with varying tensile strengths, impact strengths, hardness, flexibility, lubricity, temperature tolerances, and ultraviolet tolerances to appeal to different classes of consumers and uses and to allow differentiation in marketing.

Another object of this invention is to provide a bicycle or motorcycle chain which appeals to persons who commute to school or work in good clothing and want to stay clean of messy oil and dirt associated with oil.

Another object is to provide an endless chain of linked rigid segments with a minimum of moving parts, as each of its modules consists of one part only (or two joined parts only), and movement occurring between such pans is concentrated at a relatively frictionless area.

Another object of this invention is to provide an endless chain of linked segments which has low mass and inertia and is thus relatively easy to power.

Another object of this invention is to provide an endless chain of linked segments which has low mass and inertia and is thus unlikely to become tangled in use.

Another object of this invention is to provide an endless chain of linked segments which has improved aerodynamic characteristics.

Another object of this invention is to provide an endless chain of linked segments which requires no specially designed, breakage-prone link pin.

Another object of this invention is to provide a chain, the links of which can themselves be flexible to store and release power should this be desired.

Another object of this invention is to provide an endless chain of linked segments, the length and tension of which may be modified from time to time with relative ease.

Another object is to provide a high performance racing bicycle chain which is extra lightweight, requires little or no oil, cleans up easily, does not rust, and which may be utilized with existing racing bicycles without necessarily making adaptations to other parts of the bicycle.

Another object is to provide a chain for mountain bicycles which is extra light-weight, requires little or no oil, cleans up easily, does not rust, and which may be utilized with existing mountain bicycles without necessarily making adaptations to other parts of the bicycle.

Another object is to provide a superior bicycle chain for use with conventional, or similarly styled, bicycle gear sprocket wheels.

Another object is to provide a superior timing-style chain for automotive and other machine timing chain and/or belt applications.

Another object is to provide a superior chain for outer space and other extreme environmental conditions.

Another object is to provide a superior motorcycle chain, modular, oilfree, rustfree, lightweight, durable, easily assembled, easily installed, easily tensioned, and easily changed.

Another object of this invention is to reduce wear to and improve the longevity of bicycle sprocket wheels by minimizing damage done to their teeth by metal chains, especially by metal chains which have become stretched by use.

Another object is to save additional bicycle weight by providing a light weight plastic bicycle sprocket wheel, and cluster of such sprocket wheels, and derailleur gears, to work with the light weight plastic bicycle chain.

Another object is to improve bicycle gear shifting performance and versatility by adding more concentric sprocket wheels closer together within clusters as permitted because the chain's design permits a narrow chain, hence closely spaced sprocket wheels.

Another object is to save additional motorcycle weight by providing a light weight plastic motorcycle sprocket wheel to work with the light weight plastic motorcycle chain.

Another object of this invention is to provide a colorful plastic jewelry chain.

Another object of this invention is to provide a colorful plastic garment belt.

Another object of this invention is to provide a wenchable plastic tow chain.

Another object of this invention is to provide a wenchable no-rust anchor chain for marine applications.

Another object of this invention is to provide an endless type chain which can be conveniently closed into a loop and reopened again for removal and replacement.

Another object of this invention is to provide an endless type chain which for many applications is superior in performance and durability to alternative products presently available.

SUMMARY OF THE INVENTION

The chain of this invention is constructed of plastic modules connected in end to end relationship. It is conceived for use as a drive chain primarily. It is claimed also for jewelry, clothing, towing, anchor, and assorted other applications. Each individual module is without moving parts and has a cavity between its front and rear ends for receiving a tooth of a sprocket wheel. Each pair of adjacent modules has a transverse pin or pins extending from one module into a transverse pin-receiving socket or sockets of the other module so as to form a rotatable joint between the modules. Various means of constructing and joining the modules are disclosed. The plastic sprocket wheel cluster which the plastic chain permits consists of stair-stepped multiple concentric rings of teeth each of which can be wider than a conventional bicycle chain now allows and which together can support each other by means of a common plastic infrastructure. The chain and cluster are light-weight and non-rusting; they can be also self-lubricating and colorful.

In a preferred "male-female" module embodiment, the present invention comprises a series of end-to-end interconnectable, essentially identical modules for constructing a chain for use with sprocket wheels as on various types of bicycles and motorcycles. Each module is made of two or more pieces joined together, generally herein to be called "halves," although they may be unequal in size. Each module as so completed forms a single body portion with no moving parts and which may be substantially rigid or to some extent flexible. The body portion of each module has two opposed interconnecting ends, and it is in the direction of one (or either) of these ends that the modules travel. In the preferred embodiment, one end of each module, which typically will be the front end, is female and contains one or more symmetrically rotatable (e.g. conical or cylindrical) "sockets" or cavities which is or are oriented transversely to the module's front-rear axis. At the opposing, typically rear or trailing, end of each module is a male end which consists of one or more solid cylinders or other such rotatably symmetrical masses ("pins" in the terminology to be used) whose diameter is slightly smaller than is the diameter of the corresponding position of the female end's socket, and such pin or pins likewise is or are oriented sideways in the same plane as the female end's socket.

In another preferred, "double-male, double-female," embodiment, there are alternating modules of two types. Half the modules are "double females" and have sideways female "sockets" at both their leading and trailing ends. The alternating "double male" modules in this embodiment have sideways male "pins" at both their fronts and rears. There is no need that both types of modules be non-unitary. For example, if the "double female" type of module is assembled from two (e.g. upper and lower) pieces, the neighboring "double male" module can be formed of a single piece. Similarly, if the "double male" modules are assembled from two (e.g. left and right) pieces, then the neighboring "double female" modules can be of unitary construction.

To fashion a chain of such modules of either preferred embodiment one assembles the two or more pieces of each divided module by snapping, locking, gluing, bonding, or otherwise assembling them together so that the female end of one assembled module embraces the assembled male end of its neighbor, allowing it perhaps 90 or more degrees of rotation (45 degrees in either direction from straight) in the plane of the hinge so formed. This process is continued until a suitable length chain has been created, then the ends are looped back to become neighbors, and then they are joined together in the same manner. The two-piece modules can be assembled removeably or permanently, though it may be desirable (and necessary in some applications) that at least one module per closed loop chain be assembled in place or non-permanently for ease of installation and removal. The structure of the end-to-end joint so formed between neighboring modules permits rotation between modules in one plane to accommodate the chain's curving travel around sprocket wheels, including travel around reverse curves. In derailleur application, enough lateral slack can be built into this joint to permit the modular chain to be shifted from one sprocket wheel to another parallel sprocket wheel in the same cluster.

There are various patterns into which the identical-looking finished "male-female" modules can be halved or otherwise divided which will permit their pieces to be so rejoined: e.g. (1) upper and lower true halves; (2) upper-rear (or front) one-quarters and other-three-quarter pieces; (3) right and left halves; (4) fight-front (or rear) one-quarters and other-three-quarter pieces; (5) top to bottom across female end bisecting the socket lengthwise; (6) right-left split female ends with upper-lower split male ends; etc. Note is made here that throughout this application the term "half," whether used as a noun or a verb, is to be interpreted to include not only identical halves but also pairs of pans, or the creation of pairs of parts, which are non-identical, asymmetrical, and/or unequal in size. Patterns (1) and (3) will work for "double female" and "double male" modules. Not all of these methods of dividing the module will work for the perhaps special "loop-closer" module needed to close the two ends and make a continuous loop of the modular chain. Of the six numbered examples described, (1), (2), (5) and (6) are forms of standard modules which would work also as loop closers. Of these, (5) is perhaps the least strongly connected and most difficult to assemble. Type (6) is a particularly preferred embodiment since the two halves of each module can be held together by a lock and key design, rather than by glue or bonding, and this permits them to be readily assembled and disassembled. It is this embodiment which is depicted in the first five drawings which follow.

So that the modular chain can turn and be turned by a sprocket wheel there must be, at or near the center of each module's body, a vertical cavity shaped to receive then release a single tooth of a revolving sprocket wheel. Some curve or scoop to the front, back and sides of this cavity opening may be desirable to facilitate reception and release of a sprocket wheel tooth, particularly during shifting or when the teeth are tapered. The vertical cavity should go all the way through the module's body, top to bottom, or there should be both a top and a bottom indentation type of cavity, in applications where, as with typical derailleur-fitted bicycles, the chain must travel reverse curves. The vertical cavity should receive the tooth deeply, and its walls should be steep at least part of the way down, so that the tooth's work edge and the cavity wall make a strong contact perpendicular to the sprocket wheel's radius, the better to transmit torque.

In one preferred embodiment the modules, and half-modules, are each integrally formed of a suitable plastic material, such as a nylon-fiberglass or nylon-carbon fiber mix, or other elastomer or acetal plastic, providing for a very low friction or substantially frictionless rotatable joint between modules. (The tensile strength, impact strength, friction, lubrication, weight, color, and other properties of the plastic can be modified and balanced for various applications by the mix of ingredients and additives used.) In such an embodiment, the rotatable joint can be considered to be self lubricating and is positioned internally to the module where it is not apt to become dirty; also, it can be antistatically treated and shaped to expel dirt.

EIG. 17 generally illustrates an angle view of a "double female" type module manufactured in one single piece.

Figure 18:
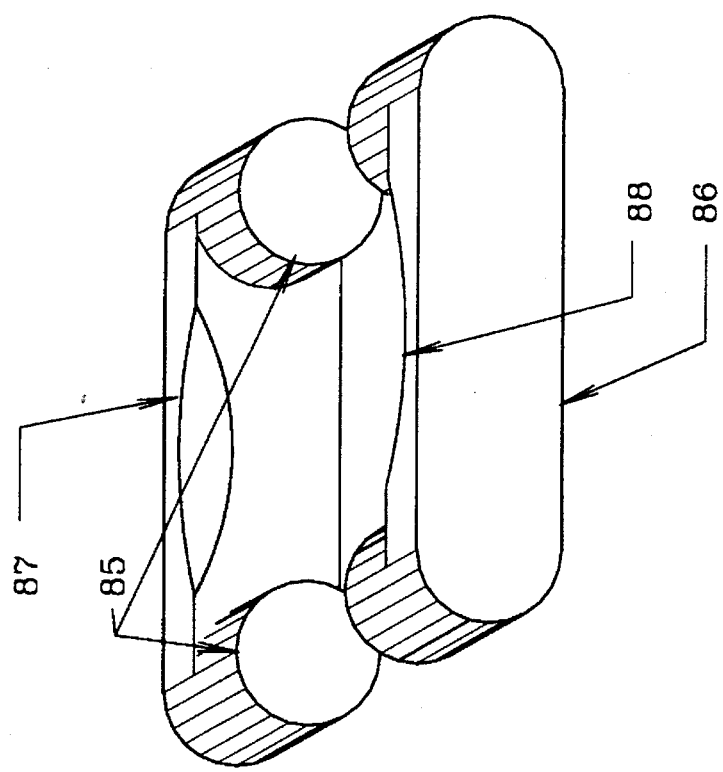
Figure 17:
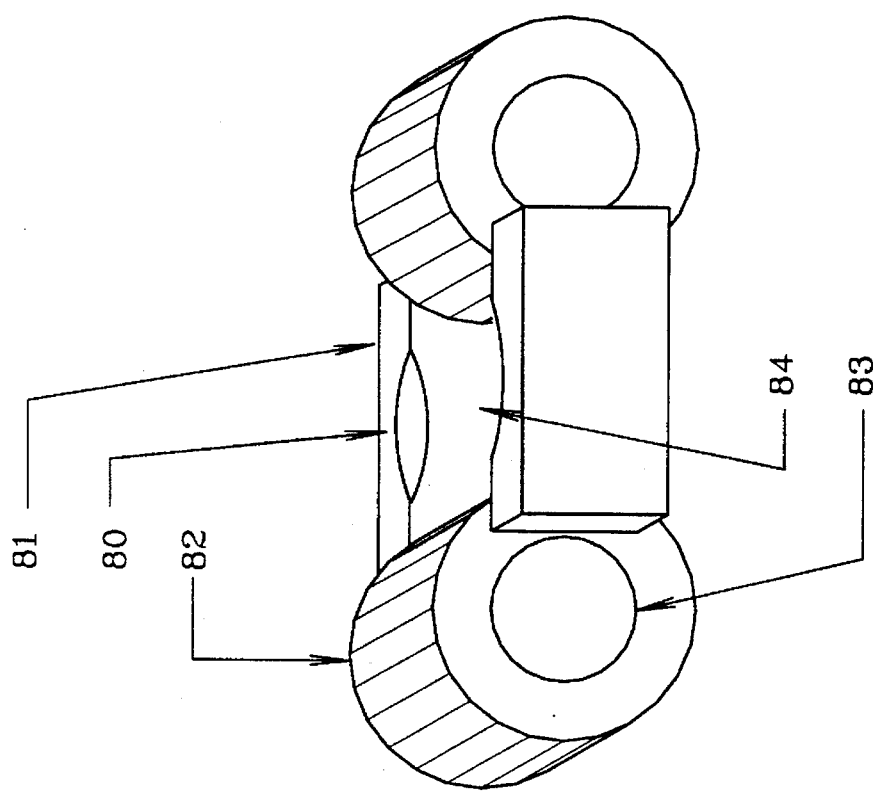

FIG. 18 generally illustrates an angle view of a "double male" type module which is split into right/and left halves and is designed for use in alternation with the FIG. 17 type module.

DETAILED DESCRIPTION OF THE PREFERRED EMBODIMENTS

Figure 1:
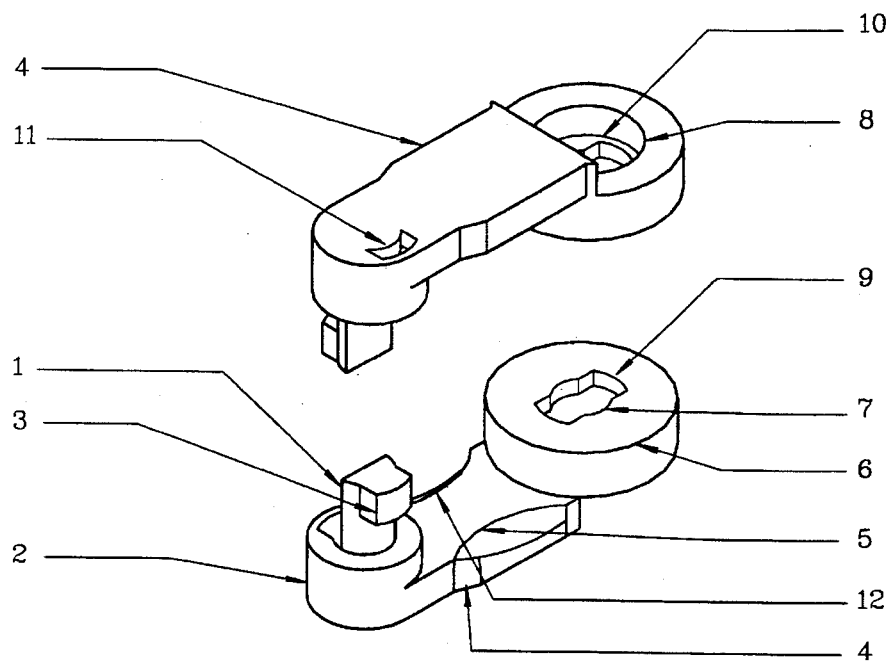
FIG. 1 generally illustrates a perspective view of two separated, and poised to be joined, identical half modules, or links, of the chain in a preferred key-lock, male-female embodiment. The module is divided so that its barrel, or female end, is split into right-left halves. At the same time, its pin, or male, end is a stepped diameter cylinder, the large-diameter ends of which are split left-right as are the barrel-halves and the smaller diameter extremities of which are divided into generally upper-lower halves, each of which is fitted with an outward-facing key at its unattached extremity. The socket of each barrel half is stepped to correspond to the two differing pin diameters. The socket's narrow diameter mid-section is fitted with one or more channels to permit passage of the keys during assembly, at an angle not encountered in normal use. Once the module is assembled (typically in chain fashion), each key fits into a slot provided in the opposing larger diameter pin half.

FIG. 1 generally illustrates a perspective view of two separated, and poised to be joined, identical half modules, or links, of the chain in a preferred key-lock, male-female embodiment. The module is divided so that its barrel, or female end, is split into right-left halves. At the same time, its pin, or male, end is a stepped diameter cylinder, the large-diameter ends of which are split left-right as are the barrel-halves and the smaller diameter extremities of which are divided into generally upper-lower halves, each of which is fitted with an outward-facing key at its unattached extremity. The socket of each barrel half is stepped to correspond to the two differing pin diameters. The socket's narrow diameter mid-section is fitted with one or more channels to permit passage of the keys during assembly, at an angle not encountered in normal use. Once the module is assembled (typically in chain fashion), each key fits into a slot provided in the opposing larger diameter pin half.

Plastic composition permits the module to be lightweight, integrally molded for strength and simplicity, and, to some degree, self-lubricating. Rigidity, or at least the ability to resume prior dimension after stretching or flexing, is required to the extent that the chain will not permanently stretch and cease to fit the sprocket wheels for which it is designed. Different facets of the module are identified as follows: "1" is the narrow diameter portion of the pin; "2" is the wide diameter portion of the pin; "3" is the key; "4" are the sidewalls; "5" is the scoop in the interior sidewall; "6" is the barrel; "7" is the narrow diameter portion of the socket within the barrel; "8" is the wide diameter portion of the socket within the barrel; "9" is the keyhole; "10" is the lock; "11" is the mold-assist; and "12" is the sprocket-holder.

The module is halved or otherwise divided so that it can be reassembled with another similar module interconnectedly end-to-end, the pin of one module inside the barrel of its neighbor. See FIG. 5.

The pin end, "1/2/3," may be considered the rear of the module, as the chain will perform and wear best if the chain is oriented with this pin end traveling last and horizontal, as it passes over the top of a vertically oriented sprocket wheel.

The bearing surfaces of the pin, "2," and socket, "8," which meet one another must be very smooth to minimize friction and should fit one another loosely enough to permit rotation, tightly enough to prevent undue slack. To achieve such smoothness requires well polished molds and care. The pin must be strong to withstand stress, especially shearing stress (and some twisting stress during gear shifts) where narrow pin "1" joins wider pin "2," where "2" joins the sidewall "4," and where key "3" joins lock "10." Rounded comers and integral formation, as by injection molded plastic, will lend strength to these connecting areas of the module.

The dual diameter pin design shown in this Figure is strong at the pin's sidewall connections because its diameter is greatest there. Also, this pin design will cause the pin to be self-centering within the socket of its neighbor's barrel and thus reduce or eliminate friction between one module's interior sidewall "4" and the exterior wall of the neighboring module's barrel "6." In addition this pin design permits the barrel, "6," and the connection between its two halves, to be most massive and strong toward the pin's center, where it takes the greatest beating from and does most of its work against the teeth of sprocket wheels.

The two parallel sidewalls, "4," are integrally formed with and connected strongly at their rear end to the perpendicularly set pin, "1/2," and at their other end to a larger perpendicular barrel, "6," here shaped like a larger cylinder through which extends a void, or socket, "7/8," shaped to fit the pin, here like a dual diameter cylinder, thinnest at the center, and set perpendicularly to the sidewalls like the pin which it parallels, and sized to a diameter, along each point of its length, just slightly larger than that of the pin, "1/2," which forms the body's other end. The interiors of the parallel sidewalls, "4," are shown bevelled with a scoop, "5," to facilitate the receipt of the sprocket teeth by the sprocket holding cavity, "12," important particularly during lateral gear changes. The width of the sidewalls, "4," can be as narrow (and hence lightweight) as the strength of the plastic used will allow. The sidewalls, "4," must be fashioned narrow enough so that when the chain formed by these modules is in use on one of the smaller sprocket wheels within a cluster its exterior sidewall will not contact and be interfered with by an adjoining larger sprocket wheel.

The barrel, "6," is shown cylindrical in exterior aspect. This shape best accommodates the teeth of most bicycle and motorcycle sprocket wheels, easing the tooth's entrance and holding it secure once well inserted. The exterior walls of the barrel must be of strong material and design to stand up over time against repetitive entry hits from sprocket teeth and to transmit force from sprocket to chain to sprocket. The barrel walls cannot compress unduly under such forces for otherwise they would pinch the pin, "1/2," contained in the barrel's socket, "7/8," causing an unacceptable amount off fiction at the rotating joint between modules.

The pin/socket joint ("1/7 and 2/8") must rotate with a minimum of friction, optimally assisted by self-lubricating characteristics of the plastics or other materials used and the ultrasmooth surfaces of the parts in contact. These parts must be strong enough to take the stress of pulling action as well as of rotating between modules, especially at their respective bearing edges where pressure is applied to their contact when the chain is stretched. Also, the barrel-sidewall ("6–4") connection must be a strong one; that the two are rounded at contact and integrally injection molded lends strength to this stress point, as does the slight bulking up and rounding of the top and bottom cylinder sidewall joint.

The sprocket-holder, "12," is a generally rectangle-shaped socket or void at the center of the module, extending from bottom of the module (through to its top in the embodiment this Figure illustrates) and fitted to receive one tooth at a time of a sprocket wheel. The cylindrical shape of the barrel exterior makes for a generously sized opening and sloping wall at the sprocket-holder's front and rear and helps it to receive and release sprocket teeth. This shape also provides maximum strength at its center, where the work edges of the seated tooth and the barrel's exterior meet each other at the perpendicular when torque is applied and transmitted between sprocket wheels. Even so, since the sprocket teeth typically have rounded corners, the joint between the sidewall and barrel can be strengthened, if desired, by bulking up and rounding the corners of this joint slightly, especially at the otherwise most weakly connected tops and bottoms. In applications where the chain must run through reverse curves, such as with a bicycle derailleur, it is essential that both the top and the bottom of the module have either a separate or a shared sprocket-holder. The rectangular top to bottom hole clear through the module in this Figure is a shared sprocket holder, and will accept sprocket teeth from either sides, working thus for standard and for reverse curves.

In this embodiment, each narrow half-pin, "1," is fitted with an outward-facing key, "3," at or near its unattached extremity. No glue or permanent bonding is required in this embodiment of the invention because the module halves are held together by the keys, "3," rotated keyholes, "9," and locks "10." The socket of each barrel half is stepped to correspond to the two differing pin diameters, and at the narrow mid-section is fitted with one or more keyhole channels "9" to permit passage of the keys during assembly, at an angle not encountered in normal use. Once the module is assembled (at right angles to its neighbor) in chain fashion, one module's socket embracing its neighbor's pin, each key fits into a slot or lock provided in its opposite halls larger diameter pin, and its withdrawal is impeded by "7," the narrow diameter portion of the neighboring module's socket, when the links are positioned in normal use.

Two features shown in this Figure, the two-sided keyhole, "9," and the mold-assist, "11," are inessential to the chain's function but merely facilitate manufacturing economies. A single sided keyhole could also be employed, which would further reduce the remote chance of accidental disassembly, since the two keys could not pass simultaneously. The mold-assist is unnecessary if one is willing to have the module pieces be asymmetrical or to use advanced (and more expensive) molding techniques.

Figure 2:
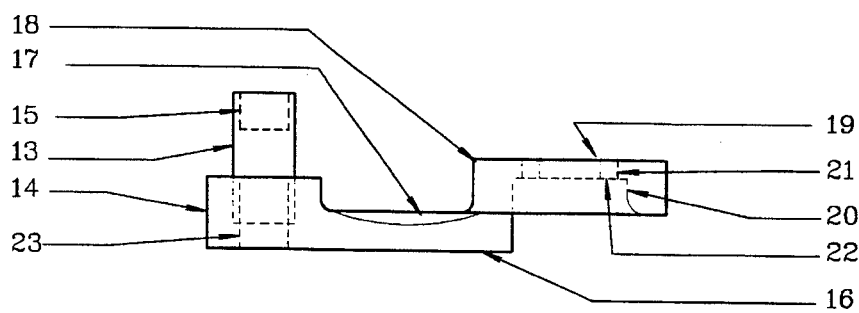
FIG. 2 generally illustrates one symmetrical half of a single module, or link, of the chain in a preferred FIG. 1 type embodiment viewed from above.

FIG. 2 generally illustrates one symmetrical half of a single module, or link, of the chain in a preferred FIG. 1 type embodiment viewed from above. Different facets of the module are identified as follows: "13" is the narrow diameter portion of the pin; "14" is the wide diameter portion of the pin; "15" is the key; "16" are the sidewalls; "17" is the scoop in the interior sidewall; "18" is the barrel; "19" is the narrow diameter portion of the socket within the barrel; 20" is the wide diameter portion of the socket within the barrel; "21" is the keyhole; "22" is the lock; and "23" is the mold-assist.

Figures 3, 4:
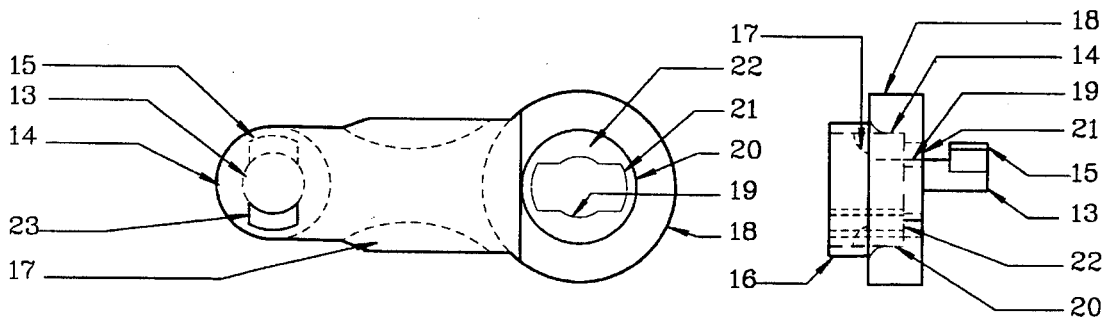
FIG. 3 generally illustrates one symmetrical half of a single module, or link, of the chain in a preferred FIG. 1 type embodiment viewed from the side.
FIG. 4 generally illustrates one symmetrical half of a single module, or link, of the chain in a preferred FIG. 1 type embodiment viewed from the female end.

FIG. 3 generally illustrates one symmetrical half of a single module, or link, of the chain in a preferred FIG. 1 type embodiment viewed from the side. Different facets of the module are identified as follows: "13" is the narrow diameter portion of the pin; "14" is the wide diameter portion of the pin; "15" is the key; "16" are the sidewalls; "17" is the scoop in the interior sidewall; "18" is the barrel; "19" is the narrow diameter portion of the socket within the barrel; 20 is the wide diameter portion of the socket within the barrel; "21" is the keyhole; "22" is the lock; and "23" is the mold-assist.

FIG. 4 generally illustrates one symmetrical half of a single module, or link, of the chain in a preferred FIG. 1 type embodiment viewed from the female end. Different facets of the module are identified as follows: "13" is the narrow diameter portion of the pin; "14" is the wide diameter portion of the pin; "15" is the key; "16" are the sidewalls; "17" is the scoop in the interior sidewall; "18" is the barrel; "19" is the narrow diameter portion of the socket within the barrel; "20" is the wide diameter portion of the socket within the barrel; "21" is the keyhole; "22" is the lock; and "23" is the mold-assist.

Figure 5:
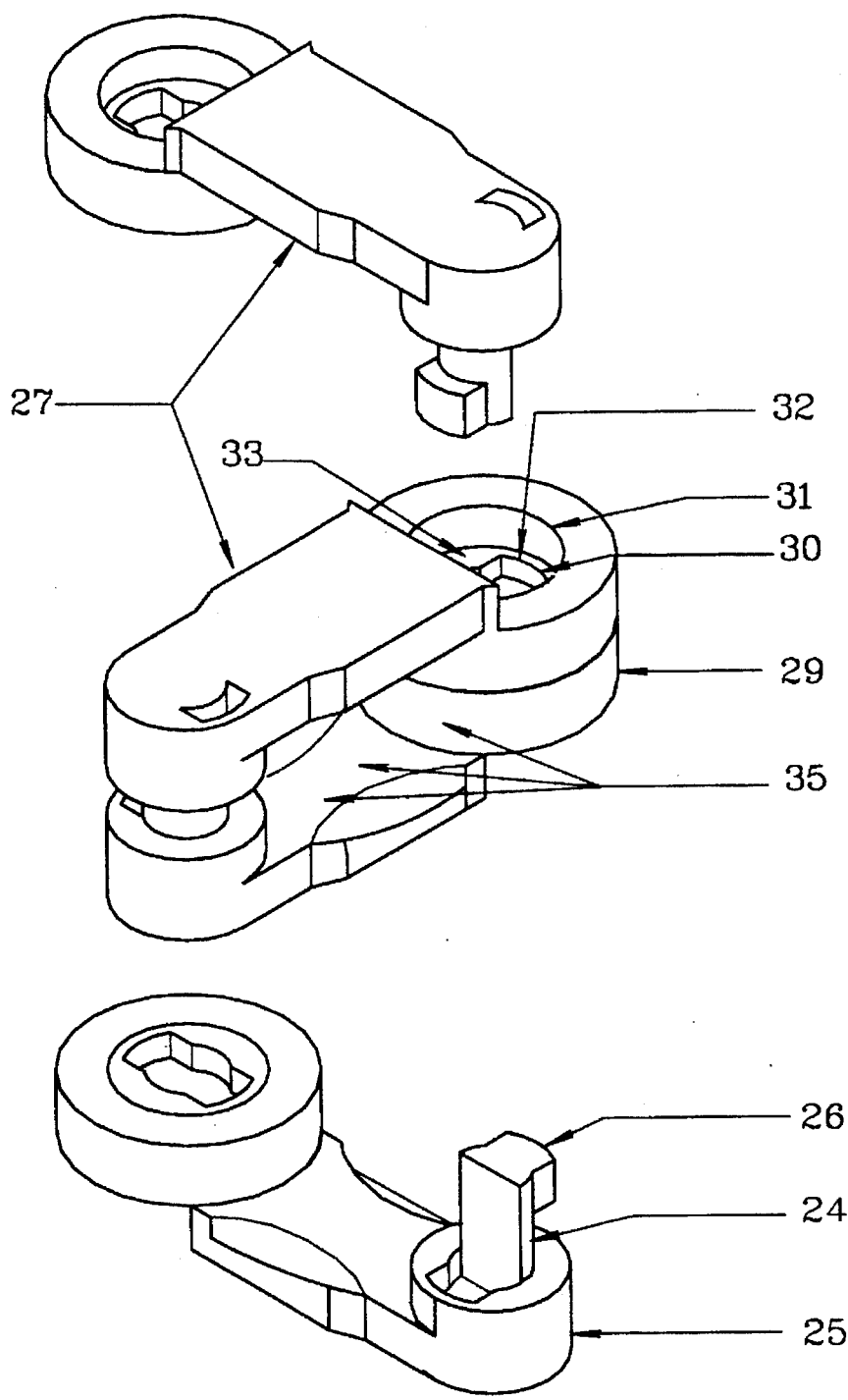
FIG. 5 illustrates from an angle two FIG. 1 type modules of the chain. The two halves of one are pressed together. At right angle assembly position with respect to the first, the second module's two halves are shown as yet separate but poised to be slipped past one another through the key and inside the socket of the first so that the inward planar surfaces of the second module's split cylinder male ends will lie together within and through the two adjoining half-barrels of the first module while the outward-facing keys of the second module's split cylinder male ends will fit into notches provided in the wider-diameter portion of the opposing pin half.

FIG. 5 illustrates from an angle two FIG. 1 type modules of the chain. The two halves of one are pressed together. At fight angle assembly position with respect to the first, the second module's two halves are shown as yet separate but poised to be slipped past one another inside the socket of the first so that the inward planar surfaces of the second module's split cylinder male ends will lie together within and through the two adjoining half-barrels of the first module while the outward-facing keys of the second module's split cylinder male ends will fit into notches provided in the wider-diameter portion of the opposing pin half. Different facets of the module are identified as follows: "24" is the narrow diameter portion of the pin; "25" is the wide diameter portion of the pin; "26" is the key; "27" are the sidewalls; "28" is the scoop in the interior sidewall; "29" is the barrel; "30" is the narrow diameter portion of the socket within the barrel; "31" is the wide diameter portion of the socket within the barrel; "32" is the keyhole; "33" is the lock; "34" is the mold-assist; and "35" is the sprocket holder.

The right angle position is necessary to assemble and to disassemble the modules due to the design of the keyhole and lock mechanism. When the chain is placed in normal use such a position between adjoining links is not attained, thus unintended disassembly is prevented.

Figure 6:
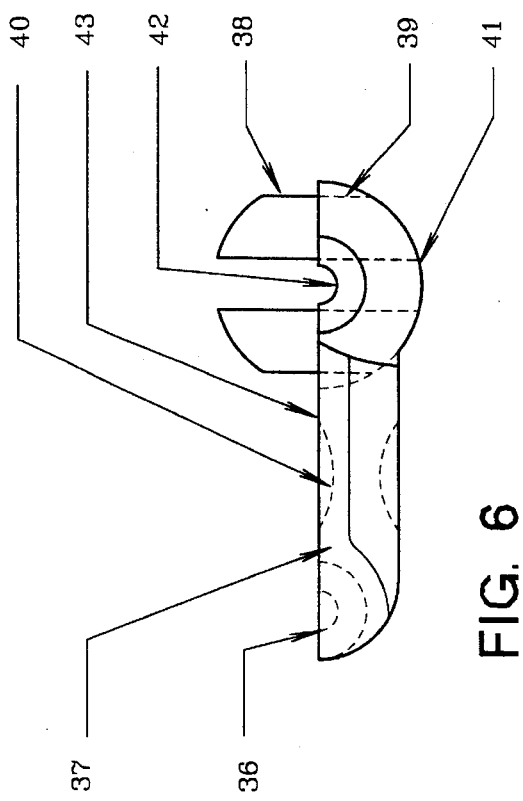
FIG. 6 generally illustrates a single half-module, or link, of the chain in a preferred male-female embodiment viewed from one side where the module is divided into two symmetrical halves, a true upper half and a true lower half, with opposing connectors capable of being snapped, glued or ultrasonically bonded together and where, for illustration, the pin is given a narrow-waisted double truncated cone shape.

FIG. 6 generally illustrates a single half-module, or link, of the chain in a preferred male-female embodiment viewed from one side where the module's division is into two symmetrical halves, a true upper half and a true lower half, with opposing connectors capable of being snapped, glued or ultrasonically bonded together and where, for illustration, the pin is given a narrow-waisted double truncated cone shape. Different facets of the module are identified as follows: "36" is the pin; "37" are the sidewalls; "38" are the male and "39" are the female connectors; "40" is the scoop in the interior sidewall; "41" is the barrel; "42" is the socket within the barrel; and "43" is the sprocket holder.

Figure 7:
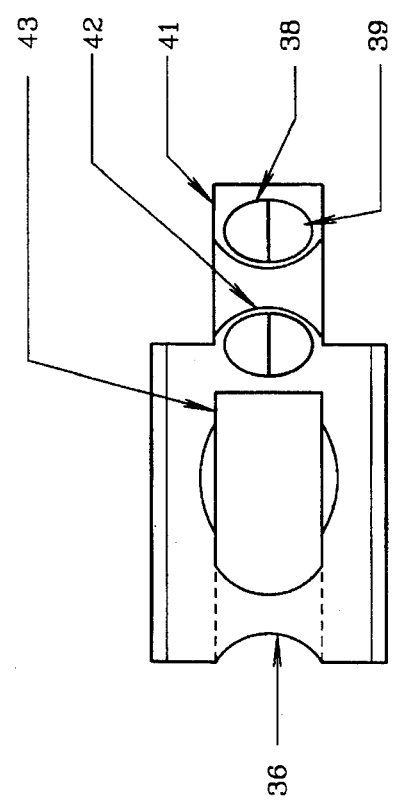
FIG. 7 generally illustrates a single half-module, or link, of the chain in a preferred FIG. 6 type embodiment viewed from above.

FIG. 7 generally illustrates a single half-module, or link, of the chain in a preferred FIG. 6 type embodiment viewed from above where the module is divided into two symmetrical halves, a true upper half and a true lower half, with opposing connectors capable of being snapped, glued or ultrasonically bonded together. Different facets of the module are identified as follows: "36" is the pin; "37" are the sidewalls; "38" are the male and "39" are the female connectors; "40" is the scoop in the interior sidewall; "41" is the barrel; "42" is the socket within the barrel; and "43" is the sprocket holder.

Figure 8:
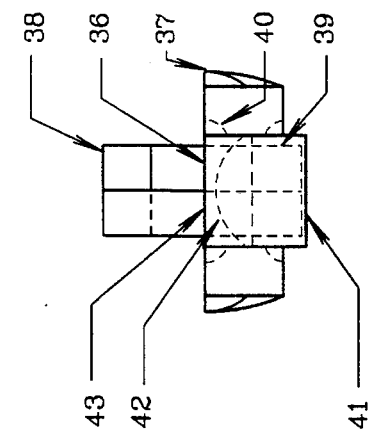
FIG. 8 generally illustrates a single half-module, or link, of the chain in a preferred FIG. 6 type embodiment viewed from the female end.

FIG. 8 generally illustrates a single half-module, or link, of the chain in a preferred FIG. 6 type embodiment viewed from the female end where the module is divided into two symmetrical halves, a true upper half and a true lower half, with opposing connectors capable of being snapped, glued or ultrasonically bonded together. Different facets of the module are identified as follows: "36" is the pin; "37" are the sidewalls; "38" are the male and "39" are the female connectors; "40" is the scoop in the interior sidewall; "41" is the barrel; "42" is the socket within the barrel; and "43" is the sprocket holder.

Figure 9:
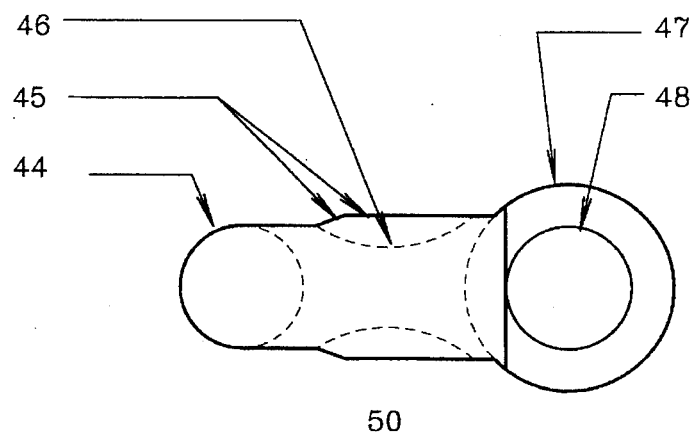
FIG. 9 generally illustrates a single half-module, or link, of the chain in a preferred male-female embodiment viewed from one side where the module is divided into two symmetrical halves, a true left and a true right half, with opposing connectors capable of being snapped, glued or ultrasonically bonded together and where, for illustration, a variant straight cylindrical shape is given the pin and socket.

FIG. 9 generally illustrates a single half-module, or link, of the chain in a preferred male-female embodiment viewed from one side where the module is divided into two symmetrical halves, a true left and a true right half, with opposing connectors capable of being snapped, glued or ultrasonically bonded together and where, for illustration, a variant straight cylindrical shape is given the pin and socket. Different facets of the module are identified as follows: "44" is the pin; "45" are the sidewalls; "46" is the scoop in the interior sidewall; "47" is the barrel; "48" is the socket within the barrel; "49" is the sprocket holder; and "50" are the connectors.

Figure 10:
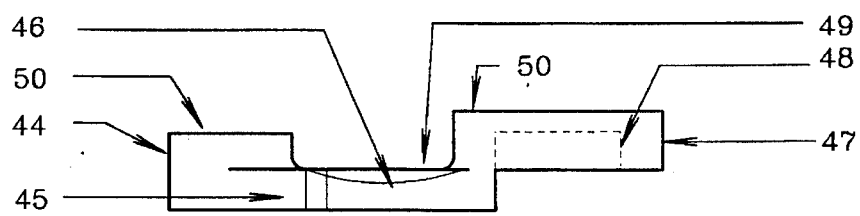
FIG. 10 generally illustrates a single half-module, or link, of the chain in a preferred FIG. 9 type embodiment viewed from above.

FIG. 10 generally illustrates a single half-module, or link, of the chain in a preferred FIG. 9 type embodiment viewed from above where the module is divided into two symmetrical halves, a true left and a true right, with opposing connectors capable of being snapped, glued or ultrasonically bonded together. Different facets of the module are identified as follows: "44" is the pin; "45" are the sidewalls; "46" is the scoop in the interior sidewall; "47" is the barrel; "48" is the socket within the barrel; "49" is the sprocket holder; and "50" are the connectors.

Figure 11:
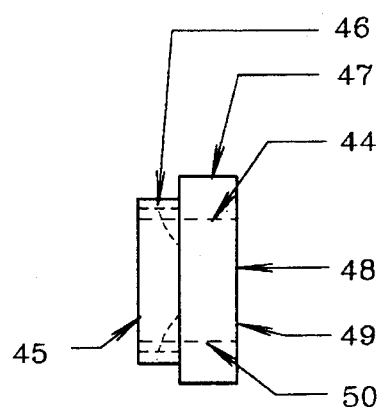
FIG. 11 generally illustrates a single half-module, or link, of the chain in a preferred FIG. 9 type embodiment viewed from the female end.

FIG. 11 generally illustrates a single half-module, or link, of the chain in a preferred FIG. 9 type embodiment viewed from the female end where the module is divided into two symmetrical halves, a true left and a true right half, with opposing connectors capable of being snapped, glued or ultrasonically bonded together. Different facets of the module are identified as follows: "44" is the pin; "45" are the sidewalls; "46" is the scoop in the interior sidewall; "47" is the barrel; "48" is the socket within the barrel; "49" is the sprocket holder; and "50" are the connectors.

Figure 12:
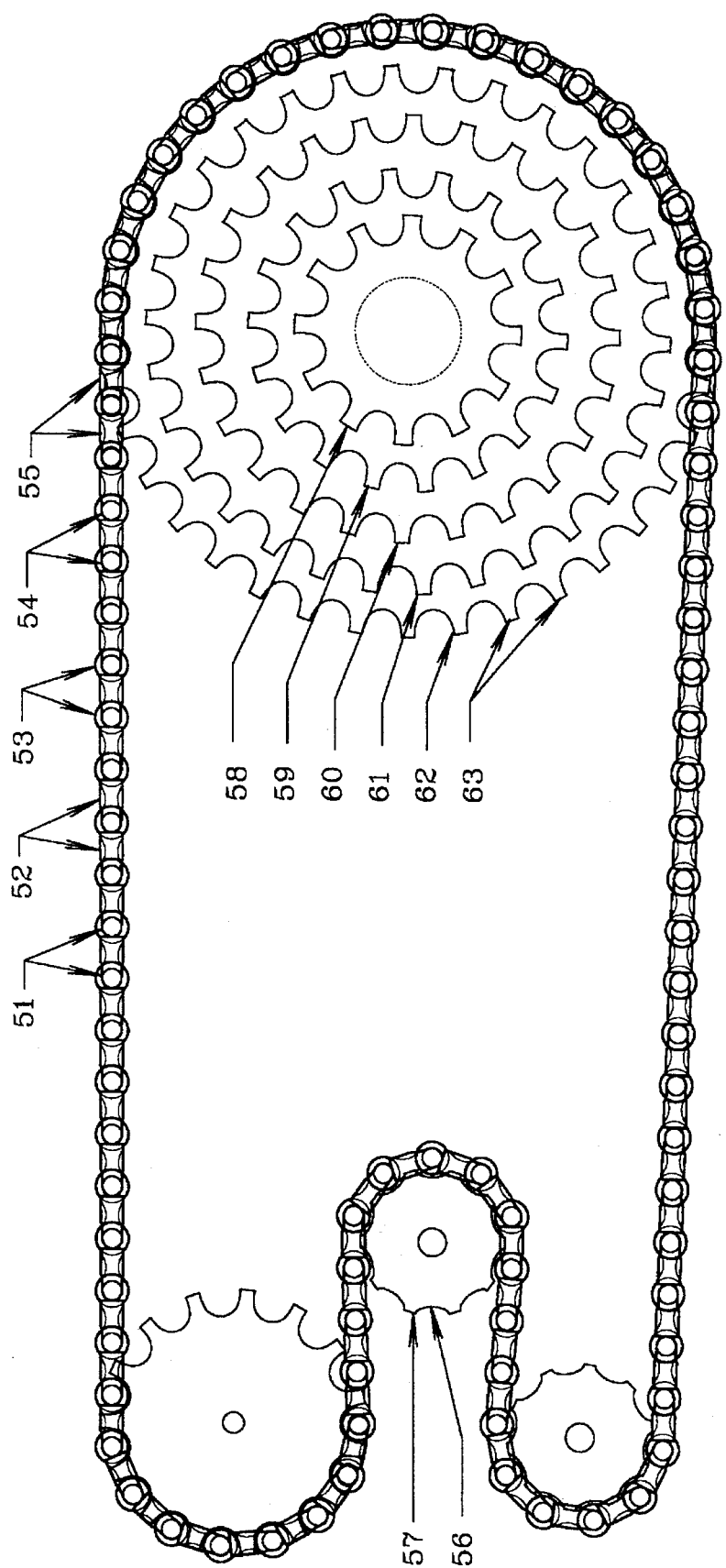
FIG. 12 illustrates generally illustrates a side view of a completed loop of rotatably joined FIG. 1 type "male-female" modules, forming an endless chain, and set to turn around and be turned by a plurality of toothed sprocket wheels (as in a derailleur bicycle application, thus illustrating, by the reverse curve, use of what might ordinarily be thought of as the chain's reverse side). Also illustrated is a cluster of multi-stage concentric sprocket rings (not necessarily circular) fashioned of a light weight plastic and positioned on a plastic cone or series of wheels.

FIG. 12 illustrates generally illustrates a side view of a completed loop of rotatably joined FIG. 1 type "male-female" modules, forming an endless chain, and set to turn around and be turned by a plurality of toothed sprocket wheels (as in a derailleur bicycle application, thus illustrating, by the reverse curve, use of what might ordinarily be thought of as the chain's reverse side). Also illustrated is a cluster of multi-stage concentric sprocket tings (not necessarily circular) fashioned of a light weight plastic and positioned on a plastic cone or series of wheels Different facets of the chain module are identified as follows: "51" is the pin; "52" are the sidewalls; "53" is the barrel; "54" is the socket within the barrel; and "55" is the sprocket holder.

The derailleur reverse curve wheel is "56" and its teeth are "57. " Different facets of the sprocket wheel cluster are identified as follows: "58" is smallest of concentric sprocket wheel ringss; "59" is a somewhat larger sprocket ring; "60" is a medium sized sprocket ring; "61" is a larger sprocket ting; "62" is a large sprocket ring; "63" are the teeth of sprocket ring cluster.

The sprocket holder, "55," is a cavity which goes through from top to bottom of each link of the chain and thus receives equally well the teeth of the derailleur's reverse curve, "56," and the teeth of the cluster, "63."

Figure 13:
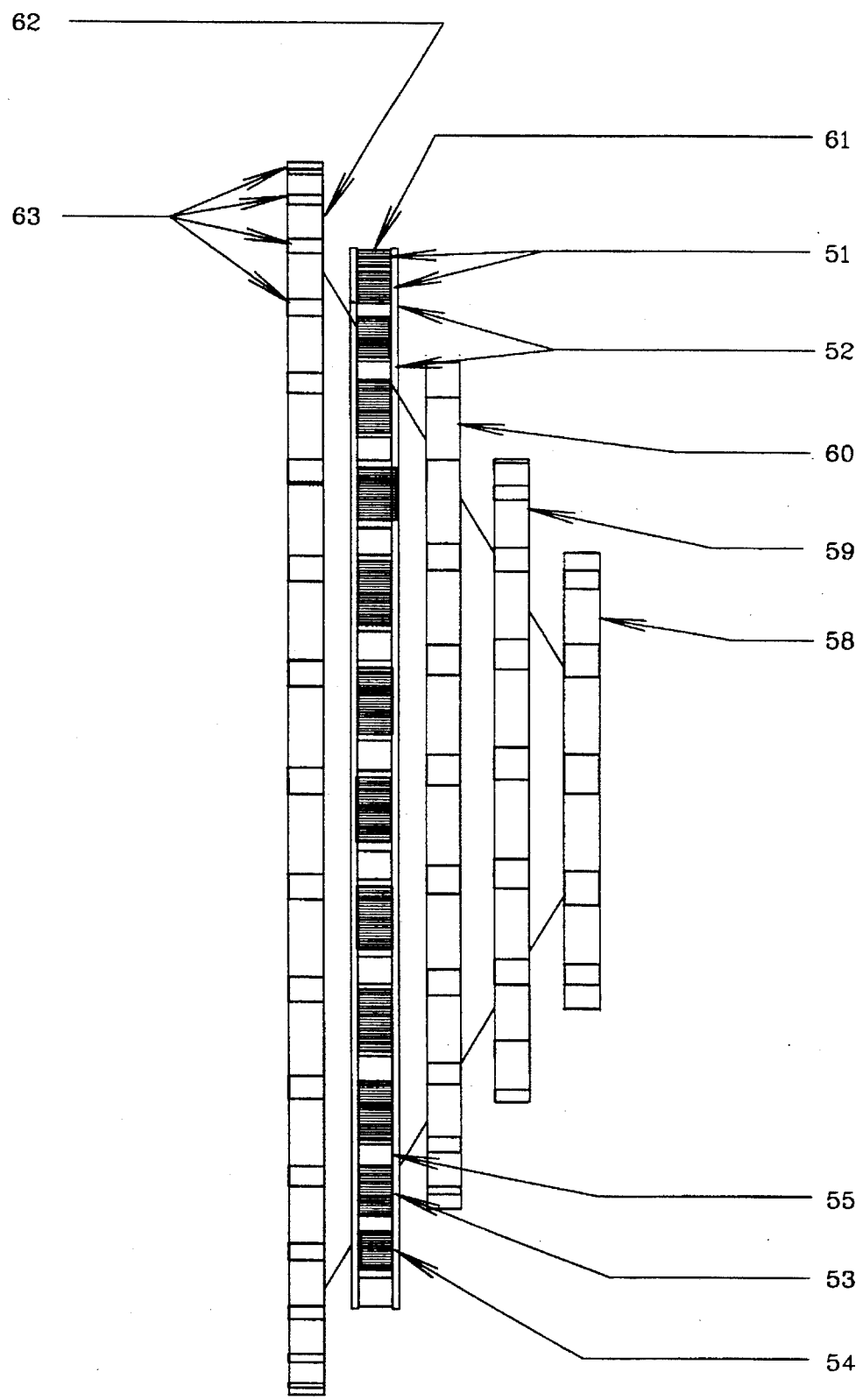
FIG. 13 generally illustrates an end view of a completed loop of rotatably joined FIG. 1 type "male-female" modules, forming an endless chain, and set to turn around and be turned by a one sprocket ring of a multi-stage sprocket ring cluster. Also illustrated is a multi-stage set of concentric sprocket tings fashioned of a light weight plastic, the teeth of which are, or may be, somewhat wider than are those of conventional clustered metal sprocket wheels.

FIG. 13 illustrates generally illustrates an end view of a completed loop of rotatably joined FIG. 1 type "male-female" modules, forming an endless chain, and set to turn around and be turned by one toothed ting of a multi-stage sprocket ring cluster. Also illustrated is a multi-stage set of concentric sprocket rings fashioned of a light weight plastic, the teeth of which are, or may be, somewhat wider than are those of conventional metal sprocket wheels. These sprocket rings may be circular, oval, or any other closed planar shape.

Different facets of the chain module are identified as follows: "51" is the pin; "52" are the sidewalls; "53" is the barrel; "54" is the socket within the barrel; and "55" is the sprocket holder.

Different facets of the sprocket ring cluster are identified as follows: "58" is smallest of concentric sprocket rings; "59" is a somewhat larger sprocket ring; "60" is a medium sized sprocket ring; "61" is a larger sprocket ring; "62" is a large sprocket wheel; "63" are the sprocket wheel cluster's teeth.

The multi-stage sprocket ring cluster ("58–63") is fashioned of a light weight plastic of similar hardness to that of the plastic modular chain. The toothed rings of the cluster need not be solid stand-alone disks but, to reduce weight, can be mounted together on a cone or other common supporting structure and connected to an axle by spokes or other infrastructure. As shown by the unlabeled straight diagonal lines in this drawing, which represent the edges of an internally braced plastic cone on which the rings are mounted, the rings can and usually would be connected to one another integrally and/or through a common infrastructure. The teeth, "63," of these sprocket rings are, or may be, somewhat wider than are those of conventional metal sprocket wheels. This is done to provide extra strength and durability to the teeth, "63." To do so is possible because all sprocket holding cavities of the chain of the present invention, "55," are equally wide, not alternatingly wide and narrow as in conventional chains.

Alternatively, one could narrow the chain and cluster the sprocket rings more closely together. Such a solution would make sense where the ability to add more gears was of paramount importance and, particularly, where the weight of metal sprocket wheels was acceptable.

Figure 14:
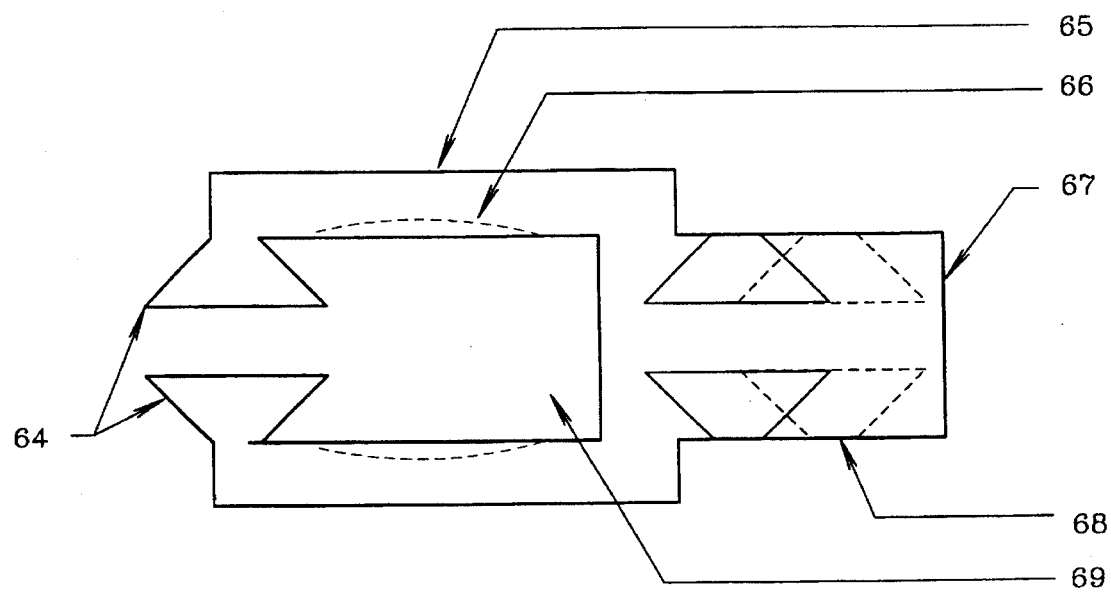
FIG. 14 generally illustrates a top view of another type of variant single module, or link, of the chain in a preferred split-pin embodiment (where the line of division between the unitary module's two joined halves or pans is not shown).

FIG. 14 generally illustrates a top view of another type of variant single module, or link, of the chain in a preferred dual or split-pin embodiment (where the line of division between the unitary module's two joined halves or parts is not shown). Different facets of the module are identified as follows: "64" are the pins; "65" are the sidewalls; "66" is the scoop in the interior sidewall; "67" is the barrel; "68" is the socket within the barrel; and "69" is the sprocket holder.

Figure 15:
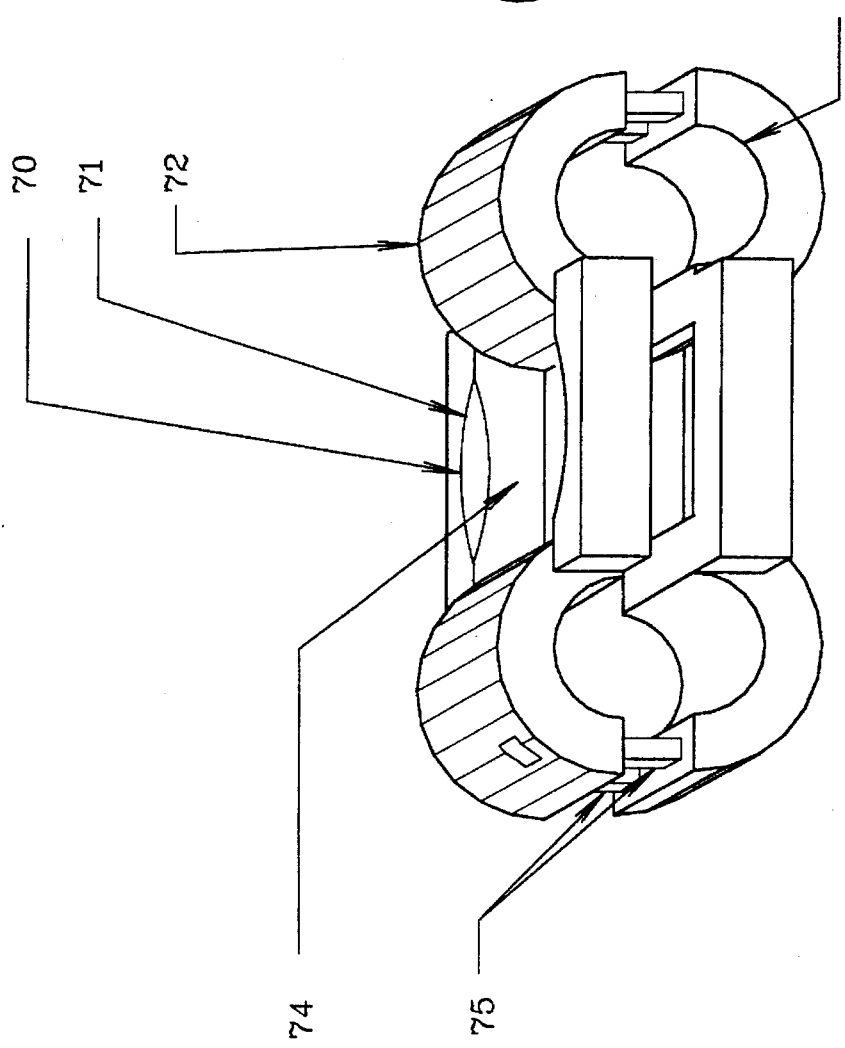
FIG. 15 generally illustrates an angle view of a "double female" type module disassembled into upper and lower halves.

FIG. 15 generally illustrates an angle view of a "double female" type module disassembled into upper and lower halves. Different facets of the chain module are identified as follows: "70" are the sidewalls; "71" is the scoop in the interior sidewall; "72" are the barrels; "73" are the sockets within the barrels; and "74" is the sprocket holder. Connecting fasteners, "75," are shown to snap the two halves of the module together, or to help them remain together once they have been joined mechanically or by glue, ultrasonic bonding, or the like. The "73" socket-side seams of the barrel, "72," are shown beveled back slightly to reduce the change of protrusions which could cause friction between it and a contained neighboring module's male pin to occur in use. This module is for use in alternation with the "double male" module shown in FIG. 16. It makes a good loop closer but may have a tendency to come apart when the chain is under tension.

Figure 16:
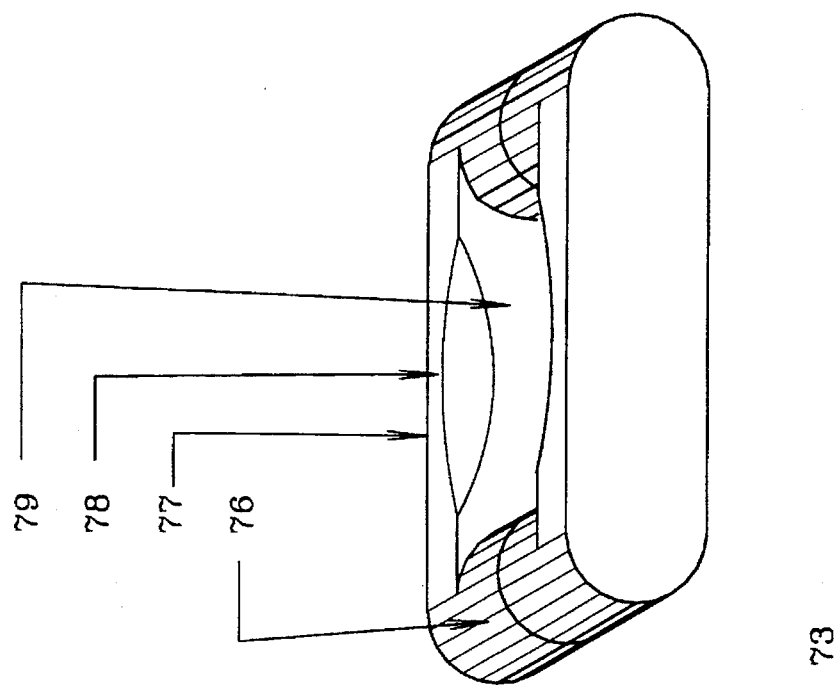
FIG. 16 generally illustrates an angle view of a single piece "double male" type module, designed for use in alternation with the FIG. 15 type module.

FIG. 16 generally illustrates an angle view of a "double male" type module designed for use in alternation with the FIG. 15 type module. Different facets of the module are identified as follows: "76" are the pins; "77" are the sidewalls; "78" are the scoops in the interior sidewalls; and "79" is the sprocket holder. This module can be manufactured in one single part. This is advantageous in terms of manufacturing and assembly cost and also in terms of reducing friction which could result from uneven seams where module halves are joined together.

FIG. 17 generally illustrates an angle view of a "double female" type module (alternate to that of FIG. 18) manufactured in one single piece. Different facets of the module are identified as follows: "80" are the sidewalls; "81" is the scoop in the interior sidewall; "82" are the barrels; "83" are the sockets within the barrels; and "84" is the sprocket holder.

FIG. 18 generally illustrates an angle view of a "double male" type module which is split into right and left halves and is designed for use in alternation with the FIG. 17 type module. Different facets of the module are identified as follows: "85" are the pins; "86" are the sidewalls; "87" are the scoops in the interior sidewalls; and "88" is the sprocket holder.

It is to be understood that the above description is intended to be illustrative and not restrictive. The bicycle chain applications are those which have been emphasized in the above specifications but are no means exclusive. Among the many other contemplated applications are included the following: tow chains, jewelry bracelets and necklaces, garment belts, purse straps, valise handles, washing machine and drier belt or chains, automotive drive and timing belts and chains, etc. The scope of the invention should, therefore, be considered not as limited by the above description, but instead with reference to the appended claims, along with the full scope of equivalents to which they are entitled.

What is claimed is:

1. An endless chain formed from a plurality of modules connected in end to end relationship, each individual module formed of plastic and being without moving pans, and each pair of adjacent modules having at least one transverse pin integrally formed with and extending from one module into at least one transverse pin-receiving socket of the other module so as to form a joint between the modules, each such joint being rotatable generally in a single plane perpendicular to said pin of the joint so formed.

2. The chain of claim 1, wherein each module defines a sprocket tooth receiving cavity between its two ends, to transmit torque between a plurality of sprocket wheels, and wherein the pins and sockets of each module are oriented parallel with respect to one another.

3. The chain of claim 1, wherein each module defines a sprocket tooth receiving cavity between its two ends, to facilitate the winding up of the chain using at least one sprocket wheel.

4. The chain of claim 1, wherein each module is ornamentally shaped.

5. The chain of claim 1, wherein each module has a pin at one of its two ends and a pin-receiving socket at its other end.

6. The chain of claim 1, wherein each module has a pin at one of its two ends and a pin-receiving socket at its other end.

7. The chain of claim 1, wherein half the modules have pins at both of their two ends, and half the modules, which in assembly alternate with the first kind, have pin-receiving sockets at both of their ends.

8. The chain of claim 1, wherein the modules are of various colors which may be selected and arranged in patterns.

9. The chain of claim 1, wherein each module is formed of a plurality of pieces, each being integrally formed and having means for being joined together with the others so that each pin of one module is embraced in a pin-receiving socket of a second and adjacent module.

10. The chain of claim 9, wherein each module is formed of two pieces comprising generally left and fight halves.

11. The chain of claim 9, wherein each module is formed of two pieces comprising generally upper and lower halves.

12. The chain of claim 9, where each module is formed of a smaller and a larger piece, their line of division also dividing the pin-receiving socket of of the module.

13. The chain of claim 9, wherein each module is formed of two halves, each of which comprises half only of the completed module's pin-receiving end, which has been divided into generally left-right halves, and half only of the completed module's pin end, at least part of which has been divided in a generally transverse direction.

14. The chain of claim 9, whereby the module pieces are of various colors which may be selected and arranged in patterns.

15. The chain of claim 9, wherein the means for joining together the plural pieces of at least some of the modules comprises projecting male tabs on one piece which line up with and fit into corresponding female slots of the other.

16. The chain of claim 9, wherein the plural pieces of at least some of the modules are joined together by ultrasonic bonding.

17. The chain of claim 9, wherein the plural pieces of at least some of the modules are joined together by solvent bonding.

18. The chain of claim 9, wherein the means for joining together the plural pieces of at least some of the modules comprises one or more key shaped appendages extending from one piece and to fit into corresponding locks situated on another piece through slots or keyholes which, once the pieces have been assembled, are rotated so as to inhibit passage of the keys.

19. The chain of claim 13, wherein the means for joining together the plural pieces of at least some of the modules comprises one or more key shaped appendages extending from one piece and to fit into corresponding locks situated on another piece through slots or keyholes which, once the pieces have been assembled, are rotated so as to inhibit passage of the keys.

20. The chain of claim 2, wherein each module is integrally formed from material having means for self-lubrication.

21. The chain of claim 2, wherein each module is integrally formed from material having a degree of flexibility so as accommodate the storing and release of energy.

22. The chain of claim 2, wherein all modules are equally wide in external transverse dimension and equally wide also across an internal transverse dimension of their respective sprocket tooth receiving cavities.

23. The chain of claim 1, wherein each pair of adjacent modules have a plurality of transverse pins, each pin extending from one module into a transverse pin-receiving socket on the other module.

24. The chain of claim 1, wherein the means for connecting adjoining modules comprises at least one channel which slants through the mass of the module's female end to each of its pin-receiving sockets and which channels are oriented in a direction away from that side of the sockets against which the pins tend to bear when the chain is placed under linear tension.

25. The chain of claim 24, wherein the channels are designed to be slightly narrower than the broadest diameter of the adjoining module's pins, and the pins of each module are narrowed at those surfaces which do not, when the chain is placed under linear tension, normally bear against either the channels or the pin-receiving sockets of an adjoining module, so that adjoining modules may be linked and unlinked, one with respect to another, only when they are positioned with respect to one another at an angle not encountered when the chain is placed under linear tension in use.

26. The chain of claim 24, wherein hinged channel gates are employed to prevent the unintended disassembly of the modules one from another during normal use.

27. The chain of claim 24, wherein hair-like intrusions into the channels integrally formed as part of the module are employed to impede unintended removal of the pins through the channels and from the pin-receiving sockets.

28. The endless chain of claim 2, further including at least one cluster of sprocket wheels, each sprocket wheel being made of plastic, comprising:

one or more toothed concentric rings of differing diameter arranged around and connected to an axle in cascading stair-step fashion by size the teeth on each of which rings
      extend outward from the center of said ring,
      are sized to correspond to the sprocket holding cavities of the chain,
      are set apart by spaces sized to accomodate the chain's connecting links, and
      include a flattened driving edge generally perpendicular to the drive chain connecting links.

29. The apparatus of claim 28, wherein at least two of the the concentric rings are integrally molded as a single structure.

30. The apparatus of claim 28 installed as a bicycle chain drive system, wherein the sprocket teeth are manufactured to a width of from approximately three thirty-seconds (3/32) of an inch to slightly in excess of one-eighth (1/8) of an inch.

31. The apparatus of claim 28, wherein color is added to the plastic of which the device is made.

32. The apparatus of claim 28 installed as a pedal-driven chain drive system, wherein the modular chain links are made of material capable of flexing under the tension applied by a human foot on a pedal, thus storing and releasing energy, and wherein the sprocket wheel tings are shaped and designed to take advantage of the chain's flexibility and so to optimize and smooth out the pedal power curve of a bicyclist.

33. The chain of claim 2, wherein the exterior of the link between each pair of adjacent modules is encircled by a durable plastic covering piece which revolves freely around it so as to reduce friction between the said link exterior and the contacting surfaces of the teeth of a sprocket wheel which engages it together with means by which the covering piece is made to encircle the barrel shaped link, and means by which it is prevented from accidentally coming away from the barrel shaped link.

34. An endless chain formed from a plurality of modules connected in end to end relationship, each individual module formed of plastic, without moving parts, and defining a sprocket tooth receiving cavity between its two ends, and each pair of adjacent modules having at least one transverse pin integrally formed with and extending from one module into at least one transverse pin-receiving socket of the other module so as to form a joint between the modules, each such joint being rotatable generally in a single plane perpendicular to said pin of the joint so formed.

35. An endless chain formed from a plurality of modules connected in end to end relationship, each individual module
      formed of plastic,
      without moving pans, and
      defining a sprocket tooth receiving cavity between its two ends, and each pair of adjacent modules having at least
      one module formed of a plurality of pieces, each such piece being integrally formed and having connecting means for being joined together with the other pieces, and
      one transverse pin integrally formed with and extending from one module into at least one transverse pin-receiving socket of the other module so as to form a joint between the modules, each such joint being rotatable generally in a single plane perpendicular to said pin of the joint so formed.

* * * * *